Dec. 4, 1951  J. L. BARRETT  2,577,671
LINEAR STRUCTURAL MEMBER
Filed Dec. 5, 1947

INVENTOR.
JOHN L. BARRETT
BY
Burton & Parker
ATTORNEYS.

Patented Dec. 4, 1951

2,577,671

UNITED STATES PATENT OFFICE 2,577,671

LINEAR STRUCTURAL MEMBER

John L. Barrett, Bloomfield Hills, Mich., assignor to Detroit Gasket & Manufacturing Company, Detroit, Mich., a corporation of Michigan Application December 5, 1947, Serial No. 789,861

2 Claims. (Cl. 189—37)

This invention relates to improvements in linear structural members and particularly to such a member designed for use as an automobile top bow.

Another object is to provide a structural member of this type which is light in weight, of inexpensive construction, and which embodies the characteristics of substantial strength and resistance to undesirable twisting, warping or bending.

Another object is to provide a structural member of this character composed of a pair of co-operating linear structural members which are so shaped and so interlocked together as to reinforce each other and provide a composite structural member possessing the desired characteristics of strength, light weight, and cheapness.

More specifically each of the component linear structural parts which goes to make up the complete structural member is of a generally channel shape in transverse cross section and one such channel-shaped part is disposed within the channel of the other part and so interlocked therewith as to provide a strong construction. A desirable feature resides in the fact that the one channel-shaped part which is disposed interiorly of the other has its side walls engaged by inwardly and downwardly turned marginal portions of the side walls of the exteriorly disposed channel-shaped part so that a tension is exerted between the side walls of the two parts tending to maintain the interlocked engagement.

The one channel-shaped part which is disposed interiorly within the other channel-shaped part is, in one embodiment, disposed therein in such a manner that the bottoms of the two parts rest one upon another and the side walls of the two parts are disposed in spaced parallel relationship and the margins of the side walls of the outer channel-shaped part are inturned into interlocked engagement with the side walls of the inner channel-shaped part. On the other hand in another embodiment the interiorly disposed channel-shaped part is inverted within the exterior channel-shaped part whereby the bottom of the interior channel serves to fill the space between the interiorly bent marginal portions of the side walls of the outer channel and lies flush therewith and the margins of the side walls of such outer channel abut the margins of the side walls of the inner channel and hold the same in place.

The interlocking engagement of the side walls of the two channel-shaped parts is such that a tension is exerted therebetween holding the two channel-shaped parts together.

One particular embodiment of this improved structure is in an automobile top bow. Such bows have heretofore been commonly formed of tubes and the tubes bent and formed into the desired shape. My structural member possesses advantages over the tubular member and my improved bow possesses advantages as a bow in the particular manner in which it is formed over the well known tubular bow.

In a preferred form of bow fabricated as herein set forth, both specific embodiments of the structural member are employed. The top portion of my improved bow employs the modification wherein the interiorly disposed channel member has the bottom of its channel arranged flush with margins of the side walls of the outer member, while the end portions of my improved bow have the two channels arranged bottom to bottom and with the side walls spaced apart but marginally interlocked and the inner channel carries a tacking strip.

Various other objects, advantages and meritorious features of the invention will become more fully apparent from the following specification, claims and accompanying drawings wherein:

Figure 1:
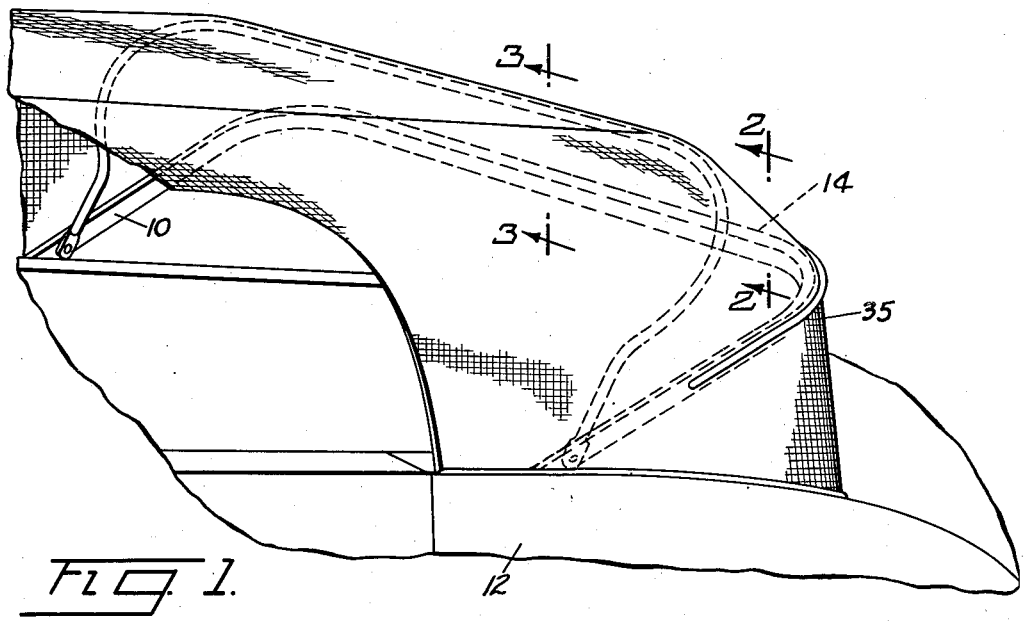
Fig. 1 is a perspective of a fragment of a cabriolet body showing an automobile top bow in use.
Figure 4:
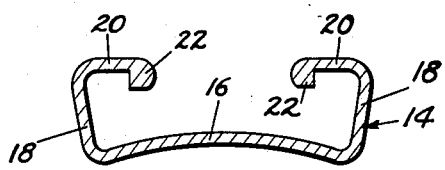
Fig. 4 is a cross sectional view through the outer channel member.

In its general aspects this invention relates to a linear structural member. Such member is shown as made up of two linear structural parts. These parts are interfitted together so as to provide a strong, light weight, relatively inexpensive structural member which is adapted to be used for different purposes. A use presently in mind is that of an automobile top bow and such a bow is illustrated as embodying this invention in the drawing. In the drawing the body indicated as 10 is illustrative of this type of article and such bow is formed of the composite linear structural member illustrated in Figs. 2 and 3.

Fig. 1 illustrates a fragment of a cabriolet body wherein the body portion is indicated as 12 and is provided with a top structure wherein the bow 10 is employed. In the fabrication of this bow I prefer to make use of the two modifications of the invention illustrated in Figures 2 and 3. The invention as embodying the body structure of Fig. 2 comprises a channel-shaped part indicated generally as 14. This channel-shaped part has a bottom which is convex upwardly as at 16 and side walls 18. Each side wall is turned inwardly as at 20 and then bent downwardly as at 22. The downwardly bent margins of the two side walls engage cooperating shoulders of the side walls of an inner channel member.

The inner channel member is shown disposed within the outer member and as having a bottom portion 24 which is convex inwardly to nest over the bottom portion 16 of the outer channel member 14. This inner channel member has two opposed side walls 26 which are provided with shoulders 28 adapted to be engaged by the edges of the downwardly turned margins 22 of the side walls of the outer channel member as shown particularly in Fig. 2. The construction is such that the side walls of the outer member exert a tension or pressure against the side walls 26 of the inner member so as to maintain the two parts snugly locked together.

Figure 3:
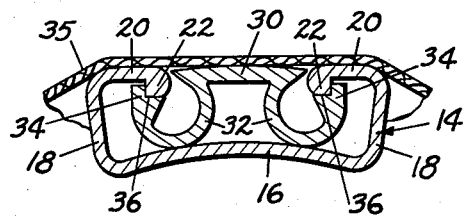
Fig. 3 is a cross sectional view taken on the line 3—3 of Fig. 1.
Figure 5:
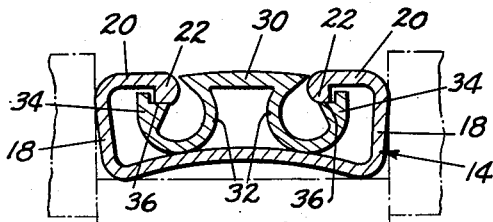
Fig. 5 is a cross sectional view showing one method of inserting the inner channel member within the outer channel member.
Figure 2:
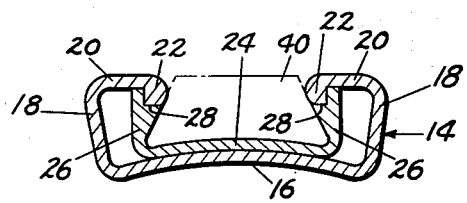
Fig. 2 is a cross sectional view taken on the line 2—2 of Fig. 1.

In the construction shown in Fig. 3 the outer channel member 14 is formed in the same fashion as shown in Fig. 2 having an interiorly convex bottom 16 and upstanding side walls 18 bent downwardly as at 20 and provided with downwardly bent marginal portions 22. The inner channel member is of a construction different from that shown in Fig. 2. This inner channel member has a bottom portion 30 and two side wall portions 32 which side wall portions are curved outwardly so that each side wall is bent reversely upon itself forming a marginal portion 34 provided with a shoulder 36 adapted to be engaged by the downwardly bent marginal portions 22 of the side walls of the outer channel member. This is shown in Figs. 3 and 5. It will be seen that in this structure the inner channel is inverted and its bottom portion is substantially flush with the portions 20 of the side walls of the outer channel member so that a piece of fabric 35 may be stretched thereacross as shown in Fig. 3 and be supported thereby.

The outer channel member is so formed that its side walls are normally spaced apart a distance such that the downwardly bent marginal portions 22 will exert a tension against the marginal portions of the inner channel member as they rest upon the shoulders thereof as shown particularly in Figs. 2 and 3.

In order to assemble the inner channel member the side walls of the outer channel member may be held inwardly as shown in Fig. 5. When held inwardly by fixtures as here shown the inner channel member may be readily inserted therebetween. Upon release of the pressure against the side walls of the outer channel member the two members are interlocked together under tension. Though in Fig. 5 the modified inner channel member shown in Fig. 3 is shown inserted in the outer channel member it is apparent that the inner channel member shown in Fig. 2 could be inserted therein in the same way.

For a linear structural member either the form shown in Fig. 2 or that shown in Fig. 3 might be employed. In the fabrication of an automobile top bow it has been found desirable to employ both modifications. The bow shown comprises the outer channel member 14 which extends for the full length of the bow and is provided with suitable end fittings. The end portions of the bow may be formed from the modification shown in Fig. 2. A tacking strip 40 is shown in dotted outline as disposed therein and as shown in Fig. 3. A fabric sheet 35 may be stretched thereover and secured thereto in any conventional manner. The intermediate or top portion of the bow may be formed of the modification shown in Fig. 3 and a bow so formed has been found to be particularly suitable for use.

What I claim is:

1. A linear structural member comprising one linear portion which is channel shaped in transverse cross section, a second linear portion which is channel shaped in transverse cross section and which is disposed within the channel of the first portion between the side walls thereof in inverted relationship with the bottom of the channel shaped second portion disposed approximately flush with the upper margins of the side walls of the channel of the first portion and with the side walls of the second portion curved outwardly upon themselves and backwardly toward the bottom of the channel and provided with inwardly disposed shoulders, the side walls of the first portion being bent inwardly toward the bottom of the second portion and then bent downwardly inside of and into abutting engagement with the shoulders of the side walls of the second portion.

2. A linear structural member comprising one linear portion which is channel shaped in transverse cross section, a second linear portion which is channel shaped in transverse cross section and which is disposed within the channel of the first portion between the side walls thereof in inverted relationship with the bottom of the channel shaped second portion disposed approximately flush with the uper margins of the side walls of the channel of the first portion and with the side walls of the second portion seating against the bottom of the first portion and then curved outwardly upon themselves and backwardly toward the bottom of the channel and provided with shoulders facing opposite margins of the bottom of the channel and spaced therefrom, the side walls of the first portion being bent inwardly toward the bottom of the second portion and then bent downwardly inside of and into abutting engagement with the shoulders of the side walls of the second portion and tensioned outwardly against the shoulders of the side walls of the second portion.

JOHN L. BARRETT.

REFERENCES CITED

The following references are of record in the file of this patent:

UNITED STATES PATENTS

| Number | Name | Date |
|---|---|---|
| 364,989 | Carmont | June 14, 1887 |
| 686,817 | Macphail | Nov. 10, 1901 |
| 1,113,559 | Jordan | Oct. 13, 1914 |
| 1,217,398 | Bonnell | Feb. 27, 1920 |
| 1,347,881 | Vetter | July 27, 1920 |
| 1,668,953 | Erickson | May 8, 1928 |
| 1,710,205 | Clark | Apr. 23, 1929 |

FOREIGN PATENTS

| Number | Country | Date |
|---|---|---|
| 556,128 | Germany | Aug. 2, 1932 |